United States Patent [19]
Smith

[11] 4,138,628
[45] Feb. 6, 1979

[54] MAGNETIZING METHOD FOR USE WITH A CATHODE RAY TUBE

[75] Inventor: Joseph L. Smith, Indianapolis, Ind.

[73] Assignee: RCA Corporation, New York, N.Y.

[21] Appl. No.: 819,095

[22] Filed: Jul. 26, 1977

[51] Int. Cl.² .................. H01J 29/70; H01J 29/76
[52] U.S. Cl. ............................ 315/368; 315/13 C; 335/210
[58] Field of Search ................. 315/368, 13 C, 8; 335/210, 212; 313/428

[56] References Cited
U.S. PATENT DOCUMENTS
4,027,219  5/1977  Van Alphen et al. ............ 315/368

FOREIGN PATENT DOCUMENTS
2611633  10/1976  Fed. Rep. of Germany.

Primary Examiner—Theodore M. Blum
Attorney, Agent, or Firm—E. M. Whitacre; P. J. Rasmussen; J. Laks

[57] ABSTRACT

A magnetic material to be located adjacent a neck portion of a cathode ray tube includes magnetized regions for producing an electron beam moving magnetic field for moving at least one electron beam within the cathode ray tube in a predetermined manner. A method for creating these magnetized regions comprises the steps of developing an appropriate magnetizing field that will magnetize magnetic domains within the magnetic material for creating the magnetized regions, and eliminating from the electron beam moving magnetic field a component contributed by relatively easily demagnetizable magnetic domains within the magnetized regions. The magnetized regions are thereby stabilized against the occurrence of significant changes in the values of the electron beam moving magnetic field.

14 Claims, 10 Drawing Figures

MAGNETIZING METHOD FOR USE WITH A CATHODE RAY TUBE

BACKGROUND OF THE INVENTION

As described in the copending U.S. patent application Ser. No. 819,093 Joseph Leland Smith, entitled, *MAGNETIZING APPARATUS AND METHOD FOR PRODUCING A STATICALLY CONVERGED CATHODE RAY TUBE AND PRODUCT THEREOF*, filed concurrently herewith, and in the copending U.S. patent application Ser. No. 819,094 Joseph Leland Smith, entitled, *MAGNETIZING APPARATUS AND METHOD FOR USE IN CORRECTING COLOR PURITY IN A CATHODE RAY TUBE AND PRODUCT THEREOF*, filed concurrently herewith, a magnetic material is located adjacent a neck portion of an in-line color cathode ray tube. A magnetizing apparatus comprising various arranged and shaped conductors is placed next to the magnetic material. A magnetizing current of appropriate direction and peak magnitude is coupled to selected ones of the conductors, creating permanently magnetized regions within the magnetic material. The magnetic field produced by these regions move the electron beams in a predetermined manner to provide for static convergence and to establish the color purity of the three in-line electron beams.

It has been observed that with the elapse of time and the stress of the environment, such as temperature cycling and exposure to random stray magnetic fields, a small but undesirable amount of misconvergence and color impurity will appear corresponding to undesirable beam motions of up to 20 or more mils. It is desirable to create the magnetized regions within the magnetic material in such a manner that these undesirable beam motions will be eliminated.

SUMMARY OF THE INVENTION

A magnetic material to be located adjacent a neck portion of a cathode ray tube includes magnetized regions for producing an electron beam moving magnetic field for moving at least one electron beam within the cathode ray tube in a predetermined manner. A method of creating these magnetized regions comprises the steps of developing an appropriate magnetizing field that will magnetize magnetic zones within the magnetic material for creating the magnetized regions, and eliminating from the electron beam moving magnetic field a component contributed by relatively easily demagnetizable magnetic zones within the magnetized regions. The magnetized regions are thereby stabilized against the occurrence of significant changes in the values of the electron beam moving magnetic field.

DESCRIPTION OF THE INVENTION

Figure 1:
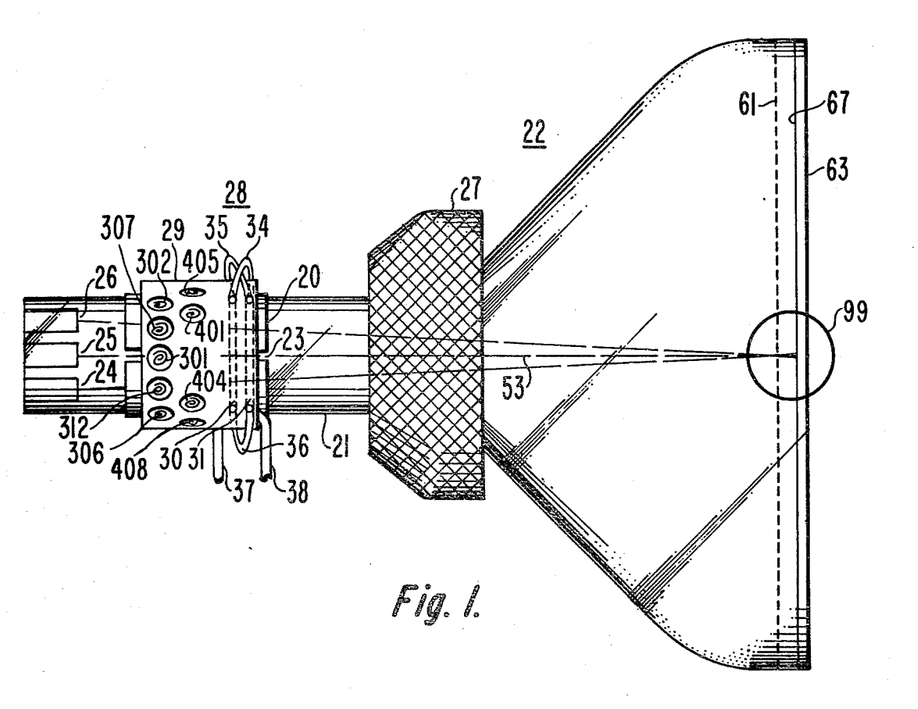
FIG. 1 illustrates a magnetizing apparatus located adjacent a magnetic material on a neck of a cathode ray tube, the magnetizing apparatus useful for practicing a method according to the invention.

In FIG. 1, a magnetic material comprising a magnetizable strip or sheath 20 is placed adjacent a neck portion 21 of cathode ray tube 22. Strip 20 is long enough to be wrapped around neck 21 providing only a small gap 23 to avoid overlying of material. The composition of the magnetic material for strip 20 may be conventional barium ferrite mixed in a rubber or plastic binder material. Strip 20 may be held in a fixed relation to neck 21 by gluing or by wrapping around the strip a thin nonmagnetic tape.

Figure 2:
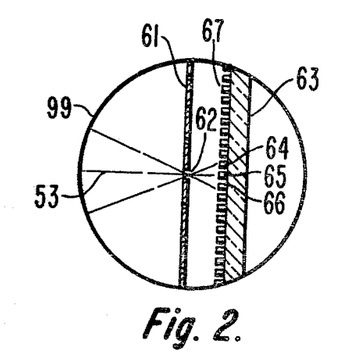
FIG. 2 is a magnified cross-sectional view of a portion of the cathode ray tube of FIG. 1 which illustrates static convergence and color purity of three in-line beams of the cathode ray tube of FIG. 1.

Cathode ray tube 22 includes three in-line guns 24, 25, and 26 for producing blue, green, and red electron beams, respectively. The green gun is illustratively along the central axis 53 of the tube. To obtain a raster, a deflection apparatus 27, which may comprise conventional horizontal and vertical windings, is placed around neck 21. Static or center convergence is achieved, as illustrated by the magnified cross-sectional view 99 of FIG. 2, when all three in-line beams intersect in the plane of a shadow mask 61 through an appropriate aperture 62 to impinge on a common phosphor trio of a phosphor screen 67 deposited on a faceplate 63 of cathode ray tube 22. Color purity is achieved when each of the three in-line beams impinges only on its respective color phosphor stripe 64, 65, or 66. Note that, although not illustrated in FIG. 2, the beam spot area of each of the beams may encompass more than one phosphor stripe of the corresponding color.

Figure 4:
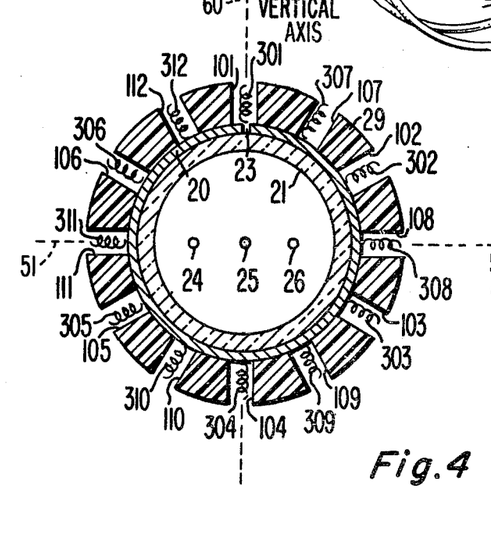
FIGS. 4 and 5 are cross-sectional views of the magnetizing apparatus of FIG. 1.
Figure 5:
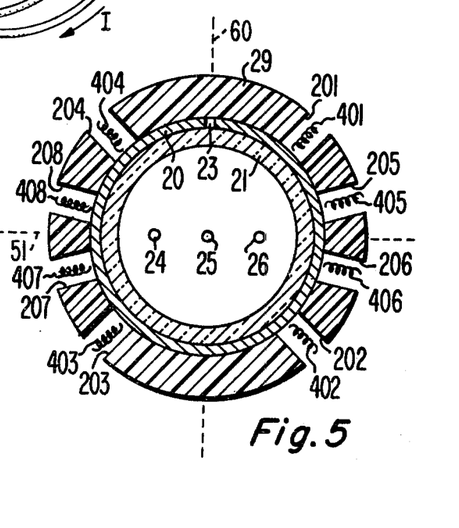

To obtain static convergence of all three beams, permanently magnetized regions of appropriate polarity and pole strength are created in magnetic strip 20. To create these regions, a magnetizing apparatus 28 is placed around magnetic strip 20, as illustrated in FIG. 1. As illustrated in FIGS. 1, 4 and 5, magnetizing apparatus 28 comprises an annular housing 29 of nonmagnetic material within which is formed a first plurality of cavities 101-112, positioned in a first axial plane perpendicular to the central axis 53 and a second plurality of cavities 201-208 positioned in a second adjacent axial plane perpendicular to the central axis 53. In each cavity is located a solenoidal winding for forming first and second pluralities of windings 301-312 and 401-408, respectively. Each of the windings include terminals, not shown, adapted to receive a magnetizing current for creating the permanently magnetized regions.

As illustrated in the cross-sectional view of FIG. 4, in the first axial plane, the first plurality of windings comprises first and second multiplicities of windings. The first multiplicity comprises six windings 301-306, each equiangularly positioned at 60° intervals about the periphery of neck 21, with winding 301 located on the vertical axis 60 of neck 21. The second multiplicity comprises another six windings 307-312, each equiangularly positioned at 60° intervals about neck 21, each winding of the second multiplicity alternating in angular positioning with a winding of the first multiplicity, with winding 307 located at 30° to the right of vertical axis 60.

As illustrated in the cross-sectional view of FIG. 5, in the second axial plane, the second plurality of windings comprises third and fourth multiplicities of windings. The third multiplicity comprises four windings 401–404, each equiangularly positioned at 45° intervals about neck 21, with winding 401 located at 45° to the right of vertical axis 60. The fourth multiplicity comprises another four windings 405–408, with a winding angularly located at +15° and at −15° from both the left and right sides of the in-line axis 51.

Figure 9:
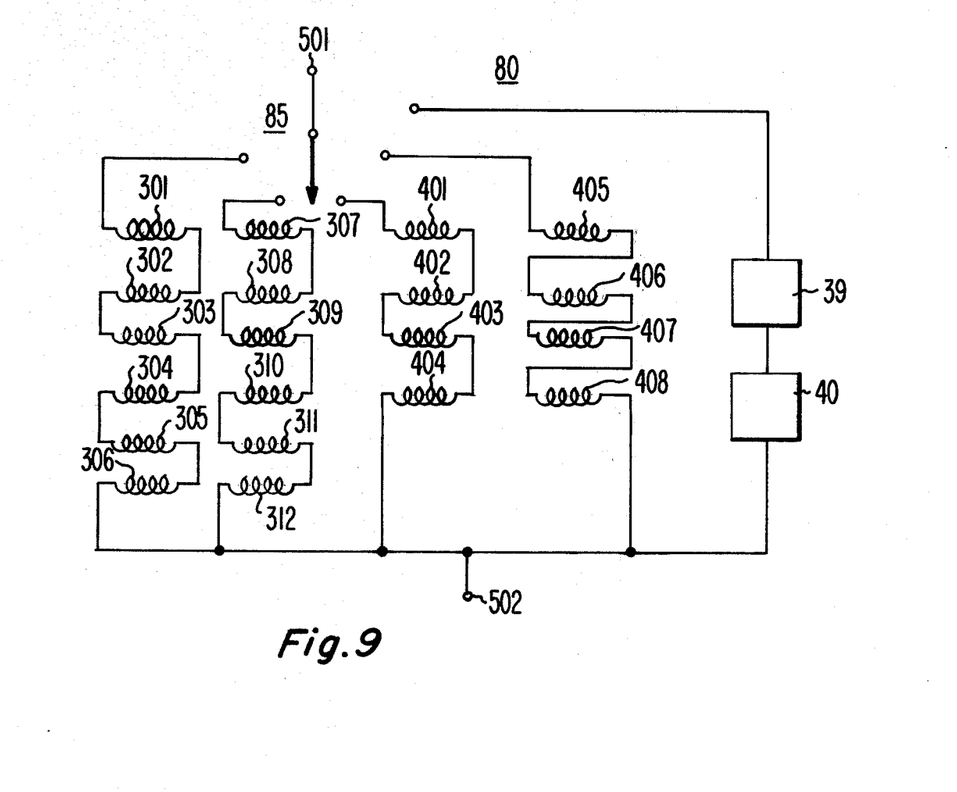

As illustrated in the circuit of FIG. 9, the windings of each of the first three multiplicities 301–306, 307–312, and 401–404 are coupled together such that the current flows in opposite direction in successive windings within the multiplicity and flows in the same direction in all the windings 405–408 of the fourth multiplicity.

As described fully in the first of the aforementioned U.S. Patent Applications by Joseph Leland Smith, with the windng coupling as described, coupling magnetizing current to the first multiplicity of windings 301–306 creates permanently magnetized regions in strip 20 that produce a six-pole or third harmonic interior magnetic field for providing like-direction horizontal motion of the outer two in-line beams. Similarly, coupling magnetizing current to the second multiplicity of windings 307–312 produces a six-pole interior magnetic field rotated by an angle of 30° from the field created by the first multiplicity providing for like-direction vertical motion of the outer two in-line beams.

Coupling magnetizing current to the third multiplicity of windings 401–404 creates permanently magnetized regions in strip 20 that produce a four-pole or second harmonic interior magnetic field for providing opposite-direction horizontal motion of the outer two in-line beams. Coupling magnetizing current to the fourth multiplicity 405–408 produces an even harmonic interior magnetic field for providing opposite-direction vertical motion of the outer two in-line beams.

With magnetizing unit 28 able to provide like and opposite-direction horizontal and vertical motion of the outer two electron beams, static convergence of the outer two electron beams onto the central beam is possible.

Figures 6, 7:
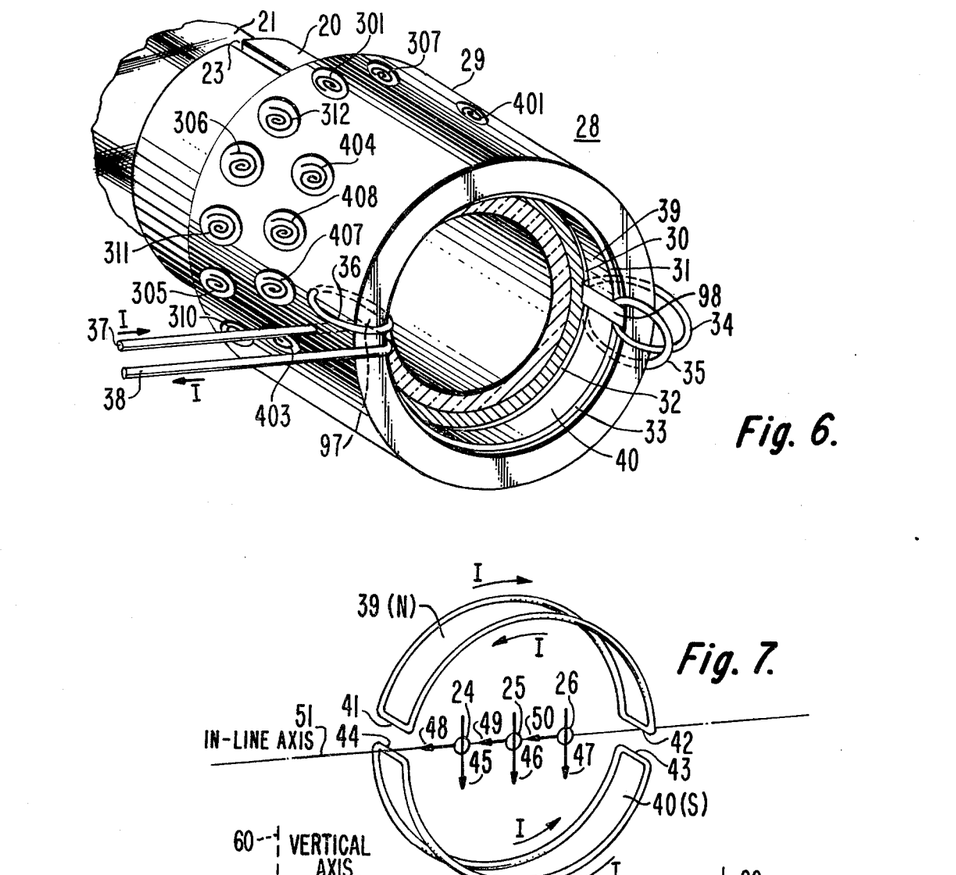
FIG. 6 is a perspective view with a portion of the cathode ray tube and magnetic material removed to illustrate that portion of the magnetizing apparatus of FIG. 1 useful for establishing color purity.
FIG. 7 illustrates magnetic field lines and forces produced by that portion of the magnetizing apparatus of FIG. 1 illustrated in FIG. 6.

To establish the color purity of all three in-line electron beams, magnetizing apparatus 28 includes a conductor arrangement located in a third axial plane perpendicular to central axis 53. As illustrated in FIGS. 1 and 6, embedded within annular housing 29, are four conductor wires 30–33 so shaped as to extend tangentially to the circumference of neck 21. The cross-section of each of the wires may either be circular or square. Spacers 97 and 98 separate wires 30 and 31 from wires 32 and 33.

Connecting wires 34 and 35 couple together ends of wires 30 and 33 and 31 and 32, respectively. The other ends of wires 30 and 31 are coupled together by a connecting wire 36. The other ends of wires 32 and 33 are coupled to terminal wires 37 and 38, respectively. Magnetizing current is coupled to terminal wires 37 and 38 for creating permanently magnetized regions for establishing color purity.

With the wire coupling as described, the four wires form two elongated conductor current loops 39 and 40, as illustrated in FIG. 7. Each of the conductor loops is therefore shaped to extend tangentially along the periphery of neck 21. If the conductor loops are energized by a peak magnetizing current I flowing in the direction of the arrows of FIG. 6, the current flows in each of the conductor loops in the direction indicated by the arrows in FIG. 7, the connecting and terminal wires 34–38 being functionally represented by end turns 41–44.

As described fully in the second of the aforementioned patent applications of Joseph Leland Smith, the magnetizing current creates magnetized regions in the material of the magnetic strip which, in turn, will produce the vertical field lines 45–47 of FIG. 7, intersecting the beams from guns 24–26 along the in-line axis 51. The field lines produce horizontal forces and motions 48–50 for establishing the color purity of the three in-line beams.

Figure 8:
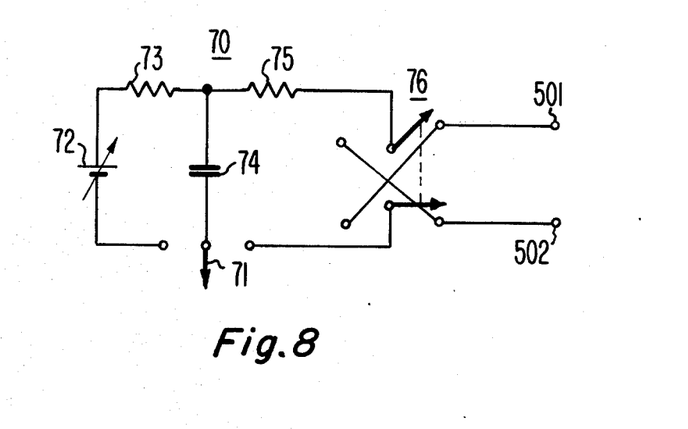
FIGS. 8-10 illustrate circuit schematics for providing current to the magnetizing apparatus of FIG. 1 for practicing a method according to the invention.

To obtain the magnetizing current, a current generating circuit 70, illustrated in FIG. 8, provides pulses of magnetizing current at output terminals 501 and 502. Circuit 70 includes a charging circuit comprising a charge/discharge switch 71, a voltage adjustable battery 72, a resistor 73 and a capacitor 74. A discharge path for the magnetizing current includes a resistor 75 and a double-pole, double-throw switch 76 for reversing current direction.

The magnetizing current pulses are coupled to an output circuit 80, illustrated in FIG. 9. Output circuit 80 comprises a rotary selector switch 85 coupled to output terminal 501, and a plurality of conductor arrangements 301–306, 307–312, 401–404, 405–408, and elongated conductor loops 39 and 40 of magnetizing apparatus 28, each arrangement coupled to a terminal of selector switch 85 and coupled to output terminal 502.

Cathode ray tube 22 is operated, and electron beam errors, such as misconvergence or incorrect color purity, are noted. The appropriate conductor arrangements are selected for energizing by selector switch 85. Battery 72 is adjusted to provide to the selected arrangement with an appropriately valued peak magnetizing current for creating appropriate permanently magnetized regions within strip 20 to provide the appropriate amount of correcting beam motion.

When using the above procedure, it has been observed that with the passage of time, a small but undesired amount of error motion developed in addition to the correcting beam motion, thereby producing a small but undesired amount of beam mislanding.

It is believed that a significant portion of this error motion is caused by the demagnetization of magnetic domains or zones within the permanently magnetizing regions of strip 20, causing a change in the values of the magnetic flux density at the electron beam locations.

Magnetizing current flowing through a selected conductor arrangement is the source of a magnetomotive force for generating a magnetizing force field H within strip 20 adjacent to the conductor arrangement. The magnetizing force field will polarize the magnetic domains or zones of strip 20 by aligning the magnetic moments of the elementary domains in the direction of the magnetizing force field.

The magnetizing force produces a magnetic induction or flux density B with a value dependent upon the permeability of the material. After removal of the magnetizing current and magnetizing force, a remanent induction or flux density $B_d$ remains within strip 20, creating the aforementioned permanently magnetized regions. Some of the flux generated by the remanent induction travels in an air path that intersects the electron beams, providing an electron beam moving flux density magnetic field for moving the electron beams in the selected predetermined manner.

The value of the remanent induction and consequently of the beam moving flux density is determined by the intersection of the magnetic load line of the magnetized strip 20 with a characteristic B-H induction curve of the magnetic material of the strip. This intersection or operating point determines the value of the remanent induction and the electron beam moving flux density. An appropriate operating point is obtained by selecting an appropriate peak magnetizing current which, together with knowledge of the hysteresis of the material, determines the induction curve values.

It is believed that a significant portion of the observed error motion results from changes in the operating point caused by such environmental and internal stresses as exposure to stray magnetic fields, temperature cycling, cyclical air path reluctance changes, or undetermined structural instabilities within the material itself. These stresses cause the induction curve to follow minor hysteresis loops paths. If the original unmagnetized strip of material is magnetized only by one or a small number of magnetizing current pulses, the minor hysteresis loops followed by the induction curve will not be identical since these loops tend to approach a stable condition only assymptotically. The operating point of the magnetized material after exposure to these stresses will be different than the initial operating point obtained immediately after the magnetization procedure is performed. It is believed that this change in operating point causes an observable error motion of the electron beams.

Alternatively explained, it is believed that a significant portion of the error motion can be described as due to the demagnetization of unstabilized magnetic domains or zones within the permanently magnetized regions of strip 20. The remanent induction remaining after magnetization is produced by the polarized zones of the magnetized regions. A portion of the remanent induction is produced by the relatively easily polarizable areas within the magnetized regions or, in other words, by that portion of the magnetic material that can be magnetized at a relatively small magnetizing force. A component of the electron beam moving flux density field will be contributed by these relatively easily polarizable zones.

The relatively easily polarizable zones are also relatively easily demagnetizable; that is, under the influence of the above-mentioned environmental stresses, these masses become demagnetized with their magnetic moments becoming misaligned. The remanent induction and electron beam moving flux density field will change, thereby producing the error motions of the electron beams.

A feature of the invention is a method of creating magnetized regions that will be stabilized against demagnetization due to environmental or internal stresses. The magnetized regions are created in such a manner that the relatively easily polarizable or demagnetizable domains do not substantially contribute to producing the electron beam moving flux density field.

Figure 10:
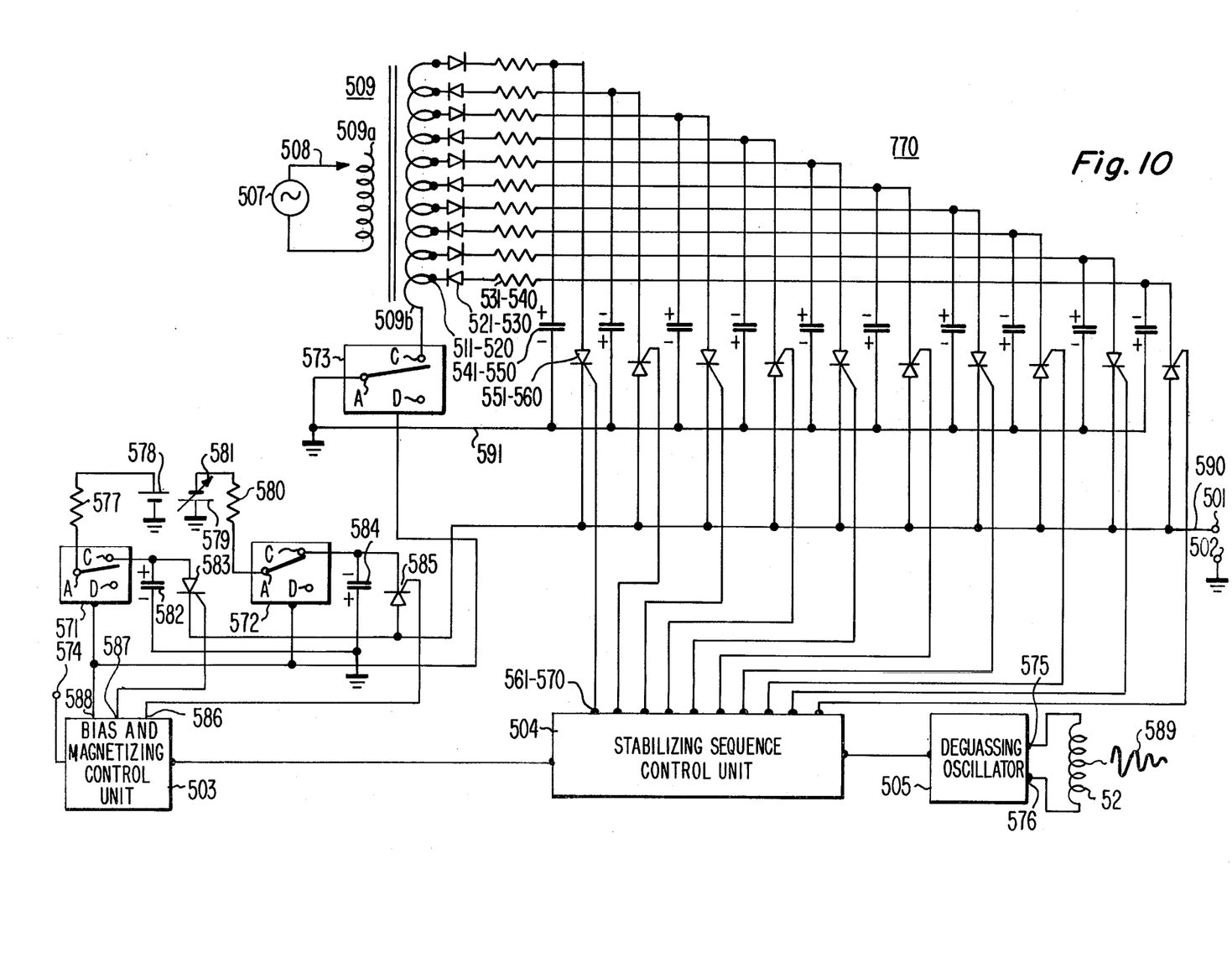

A current generating circuit 770 of FIG. 10 may be used in practicing the invention. The electron beam errors are noted on the screen of cathode ray tube 22 and the nature and amount of correcting beam motion determined. An appropriate conductor arrangement is selected by means of rotary switch 85 of FIG. 9. An appropriate peak value for the magnetizing current is selected by the position of an adjusting arm 581 of a variable battery 579 of FIG. 10. The amount of adjustment will be further described.

An initiation signal is coupled to an input terminal 574 of a bias and magnetizing control unit 503. A first switching signal is then coupled from a terminal 588 of control unit 503 to control terminals of controlled switches 571-573 for coupling together terminals A and C of each of the switches. A biasing capacitor 582 becomes charged from a battery 578 through a resistor 577, the polarity of the battery chosen so that the charge on capacitor 582 is illustratively shown as positive with respect to ground. A magnetizing capacitor 584 is charged with polarity opposite that of capacitor 582 from variable battery 581 through a resistor 580.

An AC voltage source 507, such as 120VAC, 60Hz line voltage is coupled to a variably tapped primary winding 509a of a variable transformer 509. The number of primary winding turns coupled to AC voltage source 507 is determined by the position of a wiper arm 508.

A tapped secondary winding 509b with ten fixed tap points 521-530 is magnetically coupled to primary winding 509a. As illustrated in FIG. 10, each fixed tap point is coupled to a respective one of ten stabilizing capacitors 541-550 through one of ten half-wave rectifying diodes 521-530 and one of ten resistors 531-540. Successive ones of the ten diodes 521-530 are poled in alternate directions and thus conduct on alternate half-cycles of the induced secondary AC voltage when terminals A and C of switch 573 are coupled together.

Successive ones of the ten stabilizing capacitors are charged to alternating polarity voltages, with the charge on the first leftmost capacitor 541 in FIG. 10 of the same polarity as that on biasing capacitor 582, namely, of positive polarity. The turns ratio of successive tap points is fixed, and, thus, the magnitude of the voltage impressed across next succeeding stabilizing capacitors decreases by a fixed percentage, with capacitor 541 of greatest magnitude and capacitor 550, the rightmost capacitor of the sequence, of least magnitude. By way of later example, the voltage magnitude of each succeeding capacitor is 92% of the immediately previous one, resulting in capacitor 550 having a voltage magnitude 47.2% that of capacitor 541. The voltage magnitude of the first capacitor 541 is determined by the position of wiper arm 508.

An output line 590 is coupled to output terminal 501 of output circuit 80 of FIG. 9, and an output line 591 is coupled to ground and to output terminal 502. Biasing capacitor 582, magnetizing capacitor 584 and stabilizing capacitors 541-550 are coupled across output lines 590 and 591 through the anode to cathode paths of respectively poled silicon controlled rectifiers SCR 583, 585, and 551-560. When one of the above SCR's is gated into conduction by an appropriate trigger pulse, its respective capacitor discharges a current pulse to the selected conductor arrangement of magnetizing apparatus 28 through output terminals 501 and 502. After all of the capacitors 582, 584, and 541-550 have been charged, another switching signal is coupled to switches 571-573, thereby uncoupling terminals A and C of each of the switches and coupling terminals A to unconnected terminals D.

A bias trigger pulse is coupled to the gate of SCR 583 from a trigger terminal 587 of control unit 503, gating the SCR into conduction and discharging capacitor 582.

A positive biasing current pulse is coupled to the selected conductor arrangement, creating magnetized regions within strip 20 with magnetic domains polarized in a first direction. The value of battery voltage 578 is selected to be of relatively large magnitude providing a relatively large biasing current, thereby polarizing both the easily polarizable and the more difficult to polarize magnetic areas in the first direction. A first operating point is established, wherein the remanent induction after removal of the biasing current is greater in magnitude than is required to provide the correcting beam motion and may even be of the wrong polarity.

To provide the proper amount of correcting beam motion, a magnetizing trigger pulse is coupled from a trigger terminal 586 of control unit 503 to the gate of SCR 585, gating the SCR into conduction and discharging capacitor 584. A current pulse opposite in direction to the previous bias current pulse, that is, a negative magnetizing current pulse, is coupled to the selected conductor arrangement. The previously polarized domains are now exposed to a magnetizing force of opposite polarity to that developed by the biasing current, and if the magnetizing force is of sufficient intensity, the magnetized zones will even become polarized in the opposite direction. Due to the magnetizing force, the magnetic induction follows the demagnetizing portion of the characteristic induction curve and returns along a minor hysteresis loop when the magnetizing current is removed, thereby establishing a second operating point.

By proper selection of the magnitude of the magnetizing current by means of adjusting arm 581, the second operating point is established with a remanent induction of a magnitude sufficient to approximately produce the desired amount of correcting beam motion.

To stabilize the polarized magnetic areas of the magnetized regions within strip 20, a sequence of ten successive stabilizing current pulses from capacitors 541-550 are coupled to ouput terminals 501 and 502. The sequence is initiated by an input signal to a stabilizing sequence control unit 504 from bias and magnetizing control unit 503. Trigger pulses in sequential order are coupled from trigger terminals 561-570 to respective gates of SCR 551-560, gating them into conduction. The sequence is such that first capacitor 541 discharges, then subsequent capacitors discharge until the last capacitor 550 of the sequence discharges.

The first stabilizing pulse is obtained from capacitor 541 and is of positive polarity and thus opposite in direction to the previous magnetizing current pulse from capacitor 584. Each succeeding stabilizing pulse is decreased in magnitude by a fixed percentage, as explained previously.

Since successive alternating polarity pulses decrease in magnitude, each pulsing towards the end of the sequence will result in some relatively easily polarizable or demagnetizable zones being polarized oppositely to the relatively easily demagnetizable zones polarized by the previous pulse. After a sufficient number of successively decreasing magnitude pulses, e.g., ten pulses, nearly half of the relatively easily demagnetizable zones are polarized in a direction opposite to the other half of the zones. The contributions of the relatively easily demagnetizable zones are thus eliminated from the remanent induction and, thus, also from the electron beam moving flux density field. Only the relatively difficult to magnetize zones contribute substantially to the electron beam moving flux density field, thereby stabilizing the magnetized regions against environmental and internal stresses. A stable operating point is established since only the relatively difficult to magnetize zones contribute substantially to the remanent induction.

Since the stabilization sequence will effectively remove the easily demagnetizable zones from contributing to the electron beam motion, the correcting motion produced by the previous magnetizing current pulse should be greater than that actually needed; that is, the peak magnetizing current should be adjusted to provide an overcorrecting motion. Therefore, when the stabilizing sequence is performed, and the effect of the easily demagnetizable zones is removed, the subtracting or shakeout motion produced by such removal will, when combined with the previously overcorrected motion, produce the desired net correcting beam motion.

The amount of shakeout motion needed will depend upon the amount of error motion observed when subjecting magnetized strip 20 to environmental stresses. The greater the error motion, the greater the amount of shakeout motion needed to eliminate the easily demagnetizable zones created within strip 20. The amount of shakeout motion will be determined by the setting of wiper arm 508, the location of taps 521-530, and the actual number of stabilizing capacitors used in the circuit of FIG. 10.

Magnetizing apparatus 28 and strip 20 are located on neck 21 near the electron gun structure, the G1-G4 electrode structure and other soft magnetic material located exterior to the magnetic material of strip 20. The magnetizing fields produced by the various conductor arrangements extend sufficiently far away from strip 20 to magnetize this magnetically soft material. The magnetically soft material are so easily polarizable that even the smallest magnitude stabilizing pulse obtained from capacitor 550 will magnetize the material. The magnetically soft material, therefore, also contributes a component to the electron beam moving flux density field. With the elapse of time, the material will become demagnetized due to exposure to various stresses, thereby changing the values of the electron beam moving flux density field. Thus, another significant source of undesired error motion must be eliminated.

Figure 3:
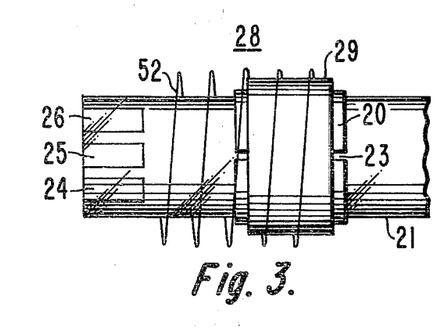
FIG. 3 illustrates a magnetizing apparatus including a plurality of conductor turns placed about the neck portion of the cathode ray tube of FIG. 1, the magnetizing apparatus useful for practicing a method according to the invention.

A second feature of the invention is to eliminate this source of error. After the stabilization sequence, control unit 504 couples an initiation signal to a degaussing oscillator 505. A ringing damped AC sinewave degaussing current 589 of FIG. 10 is coupled from output terminals 575 and 576 to a degaussing conductor 52. As illustrated in FIG. 3, degaussing conductor 52 comprises a number of conductor turns wrapped around neck 21 and the annular housing 29 of magnetizing unit 28. The values of the degaussing current is determined by the equation $I = I_{max} \sin(wt) e^{-t/T}$. The maximum current is sufficient to achieve degaussing and demagnetization of the soft magnetic material outside of strip 20 but is not large enough to affect the magnetization of the stabilized magnetized regions within the strip itself.

Current generating circuit 770 may be so designed that the aforementioned steps from the initiation signal that is coupled to input terminal 574 through to the step of coupling degaussing current to degaussing conductor 52 is performed automatically and in rapid succession with the operator being able to observe only the final result; that is, the operator being able to observe only the correct electron beam motion. If electron beam errors still remain, a new setting for arm 581 is established, and the entire sequence is reinitiated.

EXAMPLE

A television receiver with a 13" diagonal 90° deflection, slot mask, in-line cathode ray tube with a center green gun was used. The ultor voltage was 25 KV, and the gun separation was 0.26 inch. The neck diameter was 1.146" nominal.

The length of magnetic strip 20 was 3.8", width 0.675", and thickness 0.060". The gap width was 0.100" maximum. The composition of the strip was barium ferrite mixed in a rubber binder with a B-H of $1.1 \times 10^6$ gaussoersteads minimum, similar to the General Tire Compound 39900 obtainable from the General Tire and Rubber Company, Evansville, Ind.

The parameters of the magnetizing apparatus 28 comprised the following: each solenoidal winding of the four multiplicities were seven turns of 20 gauge copper wire with a winding diameter of 0.2 inch and a winding length of 0.25 inch. The elongated conductor loops for purity correction comprised four loops, each loop of 0.045 inch square cross-section copper wire, with a width along the central axis of 225 mils and an extension along the neck periphery of 1.94 inch or an angular extension to within 5° of the in-line axis.

The capacitance of each capacitor of capacitors 582, 584, and 541–550 equaled 640 microfarads.

The impedance $R_+$ exhibited by each of the conductor arrangements to each of the positively charged capacitors and the impedance $R_-$ exhibited by each of the conductor arrangements to each of the negatively charged capacitors were as follows:

| | | | | |
|---|---|---|---|---|
| First multiplicity: | $R_+ =$ .124 Ω; | $R_- =$ .152 Ω |
| Second multiplicity: | $R_+ =$ .124 Ω; | $R_- =$ .152 Ω |
| Third multiplicity: | $R_+ =$ .116 Ω; | $R_- =$ .144 Ω |
| Fourth multiplicity: | $R_+ =$ .116 Ω; | $R_- =$ .144 Ω |
| Purity correcting conductor loop arrangement: | $R_+ =$ .128 Ω; | $R_- =$ .156 Ω |

The peak degaussing current $I_{max} = 7$ Amps; $W = 1000$Hz; $T = 0.1$ second

The voltage of battery 578 and across capacitor 582 when charged $= +255$ volts.

The maximum available voltage for battery 581 and across capacitor 584 when charged $= -450$ volts.

The position of wiper arm 508 and the parameters of voltage source 507 and transformer 509 were selected such that the voltage across capacitor 541 $= +160$ volts. The position of taps 511–520 were selected such that the voltage magnitude of one stabilizing capacitor was a fixed 92% of the voltage of the immediately preceding capacitor.

A crosshatch generator connected to the television receiver provided a crosshatch test pattern on the cathode ray tube screen. The static misconvergence was determined by measuring the separation at the center region of the screen of the red and blue vertical and horizontal lines relative to the green vertical and horizontal lines. The measurement results were as follows:

$R_{H.L.} = -15$ mils, that is, the red horizontal line was 15 mils above the green horizontal line.

$B_{H.L.} = +70$ mils, that is, the blue horizontal line was 70 mils below the green horizontal line.

$R_{V.L.} = -70$ mils, that is, the red vertical line was 70 mils to the left of the green vertical line.

$B_{V.L.} = +35$ mils, that is, the blue vertical line being 35 mils to the right of the green vertical line.

The amount of correcting motion needed for each of the multiplicities was computed as follows:

| | |
|---|---|
| Fourth multiplicity: | $(R_{H.L.} - B_{H.L.})/2 = -42.5$ mils |
| Third multiplicity: | $(R_{V.L.} - B_{V.L.})/2 = -52.5$ mils |
| Second multiplicity: | $-(R_{H.L.} + B_{H.L.})/2 = -27.5$ mils |
| First multiplicity: | $-(R_{V.L.} + B_{V.L.})/2 = +17.5$ mils |

A positive sign indicates that the blue beam vertical or horizontal line moves upward or to the right respectively on the screen.

The procedure followed in providing the correcting motion of 42.5 mils when energizing the fourth multiplicity conductor arrangement will now be explained in detail. The fourth multiplicity conductor arrangement was selected for energizing by appropriate rotation of rotary switch 85. Arm 581 was adjusted to provide a voltage $V_m = -316$ volts across magnetizing capacitor 584. An initiation signal was coupled to terminal 574.

A peak bias current pulse $I_B = +2198$ amps was developed. The opposite-direction vertical motion produced by the fourth multiplicity was $-317.5$ mils, resulting in a separation of the red and blue horizontal lines of $R_{H.L.} - B_{H.L.} = -360$ mils.

A peak magnetizing current pulse of $I_m = -2194$ amps was then developed. The opposite-direction vertical motion produced was $-270$ mils resulting in a separation of the red and blue horizontal lines of $+180$ mils. Note, as the red and blue horizontal lines are separated by $+180$ mils instead of being converged one upon the other, it is apparent that the magnetizing current pulse produced an overcorrected motion, as was required and as was described above; the amount of overcorrection being $-90$ mils of motion.

The stabilizing sequence was then initiated, with a first stabilizing current pulse of $I_s = +1380$ amps. Completion of the stabilizing sequence changed the magnetic strip 20 operating point in such a manner that $+90$ mils of shakeout motion was introduced, thereby converging the red and blue horizontal lines upon each other.

The above-described procedure was repeated for each of the remaining three multiplicities, thereby achieving static convergence of the three in-line beams.

Value of $I_b$, $I_m$, and $I_s$ for the remaining conductor arrangements are as follows:

| | |
|---|---|
| third multiplicity: | $I_b + 2198$ amps; $I_m - 2375$ amps; $I_s + 1380$ amps: |
| Second multiplicity: | $I_b + 2056$ amps; $I_m - 1980$ amps; $I_s + 1290$ amps; |
| First multiplicity: | $I_b + 2056$ amps; $I_m - 1717$ amps; $I_s + 1290$ amps; |

What is claimed is:

1. A method of creating magnetized regions within a magnetic material to be located adjacent a neck portion of a cathode ray tube, said magnetized regions producing an electron beam moving magnetic field for moving at least one electron beam within said cathode ray tube in a predetermined manner, comprising the steps of:
   developing an appropriate magnetizing field that will magnetize magnetic zones within said magnetic material for creating said magnetized regions for producing said electron beam moving magnetic field; and
   applying to each of said magnetized regions an alternating polarity component magnetizing field for eliminating from said electron beam moving magnetic field a component contributed by relatively easily demagnetizable magnetic zones within said magnetized regions for stabilizing said magnetized regions and preventing substantial changes from occurring in the values of said electron beam moving magnetic field.

2. A method according to claim 1 including the step of developing a degaussing magnetic field in the region surrounding said magnetic material for eliminating a component of said electron beam moving magnetic field that is produced by magnetized material outside of said magnetic material.

3. A method of creating stabilized magnetized regions within a magnetic material to be located adjacent a neck portion of a cathode ray tube, said magnetized regions producing an electron beam moving magnetic field for moving at least one electron beam within said cathode ray tube in a predetermined manner, comprising the steps of:
developing a first magnetizing field in the vicinity of said magnetic material of a first intensity sufficient to create magnetized regions containing magnetic domains polarized in a predetermined direction;
developing a second magnetizing field in the vicinity of said magnetic material of a second intensity and of a polarity opposite that of said first magnetizing field; and
developing successively a plurality of magnetizing fields in the vicinity of said magnetic material alternating in polarity, successive ones of said plurality decreasing in intensity by a predetermined amount, thereby creating said stabilized magnetized regions.

4. A method according to claim 3 including the step of developing a degaussing magnetic field in the region surrounding said magnetic material for eliminating a component of said electron beam moving magnetic field that is produced by magnetized material outside of said magnetic material.

5. A method of creating magnetized regions within a magnetic material to be located adjacent a neck portion of a cathode ray tube, said magnetized regions producing an electron beam moving magnetic field for moving at least one electron beam within said cathode ray tube in a predetermined manner, comprising the steps of:
placing adjacent said magnetic material a magnetizing apparatus capable of being energized to develop a magnetizing field that will polarize magnetic domains within said magnetic material into alignment with said magnetizing field for creating said magnetized regions;
energizing said magnetizing apparatus to create said magnetized regions; and
energizing an apparatus which will cause the magnetic material within said magnetized regions to cyclically traverse hysteresis loops in such a manner that the magnetic domains that are relatively easily polarizable do not substantially contribute to producing said electron beam moving magnetic field, thereby stabilizing said magnetized regions and preventing substantial changes from occurring in the values of said electron beam moving magnetic field.

6. A method according to claim 5 including the step of developing a degaussing magnetic field in the region surrounding said magnetic material for eliminating a component of said electron beam moving magnetic field that is produced by magnetized material outside of said magnetic material.

7. A method of creating stabilized magnetized regions within a magnetic material to be located adjacent a neck portion of a cathode ray tube, said magnetized regions producing an electron beam moving magnetic field for moving at least one electron beam within said cathode ray tube in a predetermined manner, comprising the steps of:
placing adjacent said magnetic material a magnetizing apparatus comprising at least one conductor arrangement capable of being energized by a magnetizing current for developing a magnetizing field for creating said magnetized regions;
energizing a conductor arrangement with a magnetizing current of a first magnitude and first direction;
energizing said conductor arrangement with a magnetizing current of a second magnitude and a direction opposite that of said first direction; and
successively energizing said conductor arrangement with magnetizing currents of predetermined decreasing magnitudes and alternating in direction.

8. A method according to claim 7 including the step of developing a degaussing magnetic field in the region surrounding said magnetic material for eliminating a component of said electron beam moving magnetic field that is produced by magnetized material outside of said magnetic material.

9. A method of creating magnetized regions within a magnetic material to be located adjacent a neck portion of a cathode ray tube, said magnetized regions producing an electron beam moving magnetic field for moving at least one electron beam within said cathode ray tube in a predetermined manner, comprising the steps of:
developing an appropriate magnetizing field that will magnetize magnetic zones within said magnetic material for creating said magnetized regions for producing said electron beam moving magnetic field; and
developing a degaussing field in a region surrounding said magnetic material for eliminating a component of said electron beam moving magnetic field that is produced by magnetized material outside of said magnetic material.

10. A method according to claim 9 wherein said degaussing magnetic field comprises a magnetic field of a polarity that alternates with time and with an intensity that decreases with time.

11. A method according to claim 9 wherein developing said degaussing field is accomplished by coupling an alternating current to conductors located adjacent said neck portion.

12. A method according to claim 11 wherein the magnitude of said alternating current decreases with time.

13. A method of creating magnetized regions within a magnetic material to be located adjacent a neck portion of a cathode ray tube, said magnetized regions producing an electron beam moving magnetic field for moving at least one electron beam within said cathode ray tube in a predetermined manner, comprising the steps of:
developing an appropriate magnetizing field that will magnetize magnetic domains within said magnetic material for creating said magnetized regions for producing said electron beam moving magnetic field;
placing a plurality of conductor turns about said neck portion; and
energizing said plurality of conductor turns with a ringing alternating current for demagnetizing magnetized material outside of said magnetic material.

14. A method according to claim 13 wherein the values of said ringing alternating current are determined by the equation $I = I_{max}\sin(wt)e^{-t/T}$.

* * * * *